United States Patent

Saville

[11] Patent Number: 5,911,510
[45] Date of Patent: Jun. 15, 1999

[54] BI-DIRECTIONAL FOIL BEARINGS

[75] Inventor: Marshall Saville, Torrance, Calif.

[73] Assignee: AlliedSignal Inc., Morristown, N.J.

[21] Appl. No.: 08/950,922

[22] Filed: Oct. 15, 1997

[51] Int. Cl.[6] .................................................. F16C 17/03
[52] U.S. Cl. .......................... 384/103; 384/105; 384/106
[58] Field of Search .................................. 384/104, 106, 384/103, 105

[56] References Cited

U.S. PATENT DOCUMENTS 4,767,222  8/1988  Paletta et al. ............................ 384/106
5,228,785  7/1993  Saville et al. ............................ 384/103
5,498,082  3/1996  Nadjafi .
5,549,392  8/1996  Anderson ................................ 384/104

*Primary Examiner*—Lenard A. Footland
*Attorney, Agent, or Firm*—Robert Desmond, Esq.

[57] ABSTRACT

A foil bearing allows bi-directional rotation of a shaft. The foil bearing includes a plurality of thin compliant foils secured to a housing, and spring segments underlying the foils. Each spring segment has a first stiffness profile in a first zone and a second stiffness profile in a second zone. The first stiffness profile allows rotation in one direction, and the second stiffness profile allows rotation in an opposite direction.

11 Claims, 4 Drawing Sheets

BI-DIRECTIONAL FOIL BEARINGS

BACKGROUND OF THE INVENTION

The invention relates to bearings. More specifically, the invention relates to foil thrust bearings and foil journal bearings.

Foil journal bearings and foil thrust bearings are very attractive for high speed rotating machinery because they do not require oil-based lubrication and the maintenance demands of an oil-based lubrication system. Instead of using oil, the foil bearings use a process fluid such as air, methane, water, or gaseous or liquid hydrogen, nitrogen or oxygen.

Foil bearings that allow shaft rotation in one direction only, either clockwise or counterclockwise cause problems for high-speed machinery that requires rotation in both directions. For example, a high-speed motor might be required to turn a fan blade in a clockwise direction for blowing air and a counterclockwise direction for creating suction. Unidirectional foil bearings cannot be used in such a motor. The alterative, using separate motors for blowing and suction, is expensive and impractical.

SUMMARY OF THE INVENTION

The invention may be regarded as a foil bearing that allows rotation in first and second directions. The foil bearing comprises a housing; a foil bearing assembly including a compliant foil secured to the housing; and a spring segment underlying the foil. The spring segment has a first stiffness profile in a first portion and a second stiffness profile in a second portion. The first stiffness profile allows rotation in the first direction, and the second stiffness profile allows rotation in the second direction.

DETAILED DESCRIPTION OF THE INVENTION

Figure 1:
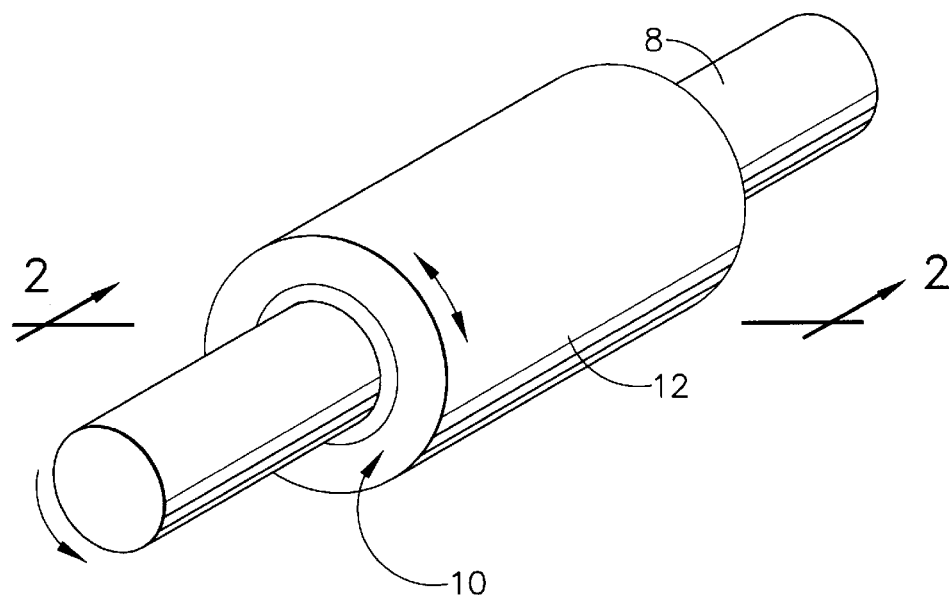
FIG. 1 is a perspective view of a foil journal bearing according to the present invention.
Figure 2:
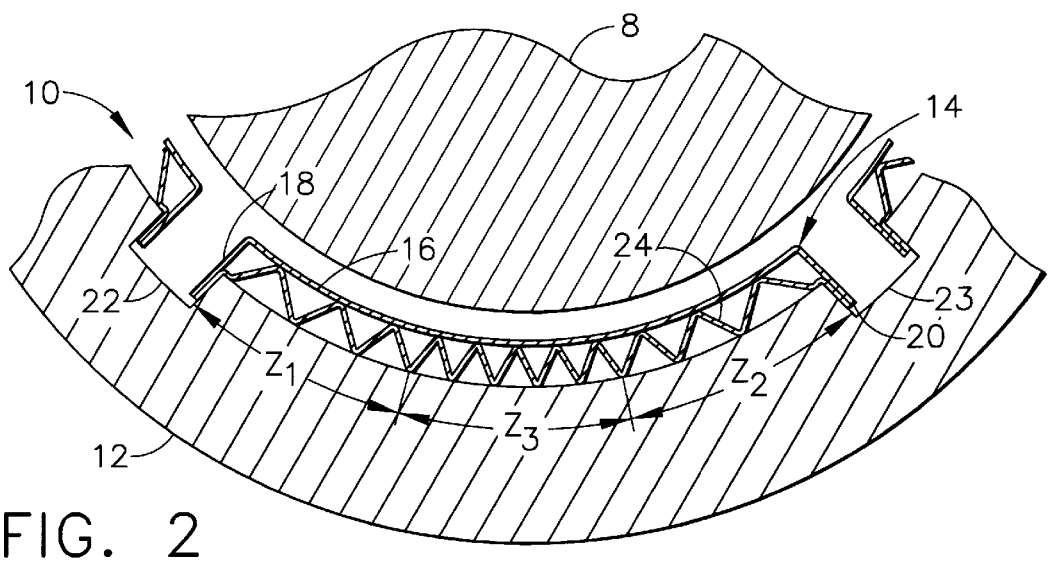
FIG. 2 is a cross-sectional view of the journal bearing shown in FIG. 1, the cross section being taken along lines 2—2 of FIG. 1.

FIGS. 1 and 2 show a foil journal bearing 10 that supports a shaft 8 and allows the shaft 8 to rotate in clockwise and counterclockwise directions. The foil journal bearing 10 includes a cylindrical housing 12 that surrounds the shaft 8 and at least one pad assembly 14 located in a gap between the shaft 8 and the housing 12. Typically, the number of pad assemblies 14 varies between three and eight. If a journal bearing 10 includes a plurality of pad assemblies, the pad assemblies 14 are non-overlapping.

Each pad assembly 14 includes at least one foil 16. Additional foils can be used to increase compliance of the journal bearing 10. The foils 16 are made of a thin, compliant metal having a curvature that is larger than the curvature of the housing 12. Each foil 16 has one or both sides secured to the housing 12. FIG. 2 shows both first and second sides secured to the housing 12. At the first side is a first tab 18, and at the second side is a second tab 20. The first and second tabs 18 and 20 are located loosely in slots 22 and 23 that extend along an axial length of the housing 12. The tabs 18 and 20 have a sufficient length to remain in the slots 22 and 23 when the foil 16 moves towards the shaft 8. Clips (not shown) at opposite ends of the housing 12 restrain the foils 16 from moving in an axial direction.

The journal bearing 10 further includes a plurality of spring segments 24 located between the housing 12 and the foils 16. The spring segments 24 provide spring forces that support the foils 16 to improve bearing load carrying capability. Relative stiffnesses of the spring segments 24 determine the amount of deflection of the overlying foils 16 and, therefore, the thickness of the fluid film above the foils 16.

Stiffness of a spring segment 24 can be controlled by corrugating portions of the spring segment 24. Stiffness of the corrugated spring segment 24 can be determined by design parameters such as the distance between corrugation peaks, the thickness of the spring segment 24, and the length of the spring segment 24. The amount of radial movement of the shaft 8 before a spring segment 24 bottoms out is dependent upon the height of the corrugations and the thickness of the spring portion.

Stiffness of the spring segments 24 is kept relatively constant in the axial direction, except perhaps at the ends, where the stiffness is slightly softer. Stiffness of the spring segments 24 is varied in the directions of rotation as described below in connection with FIGS. 5, 6 and 7.

The journal bearing 10 uses a process fluid such as air, methane, water, or gaseous or liquid hydrogen, nitrogen or oxygen. When the shaft 8 is rotated relative to the housing 12, a fluid film is generated between the foils 16 and the shaft 8. At high rotational speeds, pressure build-up within the fluid film supports the shaft 8, while maintaining a separation between the shaft 8 and the foils 16.

Figure 4:
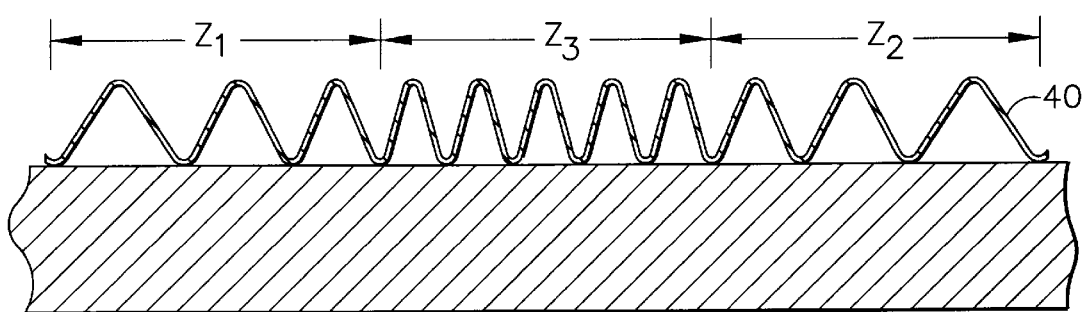
FIG. 4 is a cross-sectional view of a spring assembly, which forms a part of the foil thrust bearing shown in FIG. 3, the cross section being taken along lines 4—4 of FIG. 3.
Figure 3:
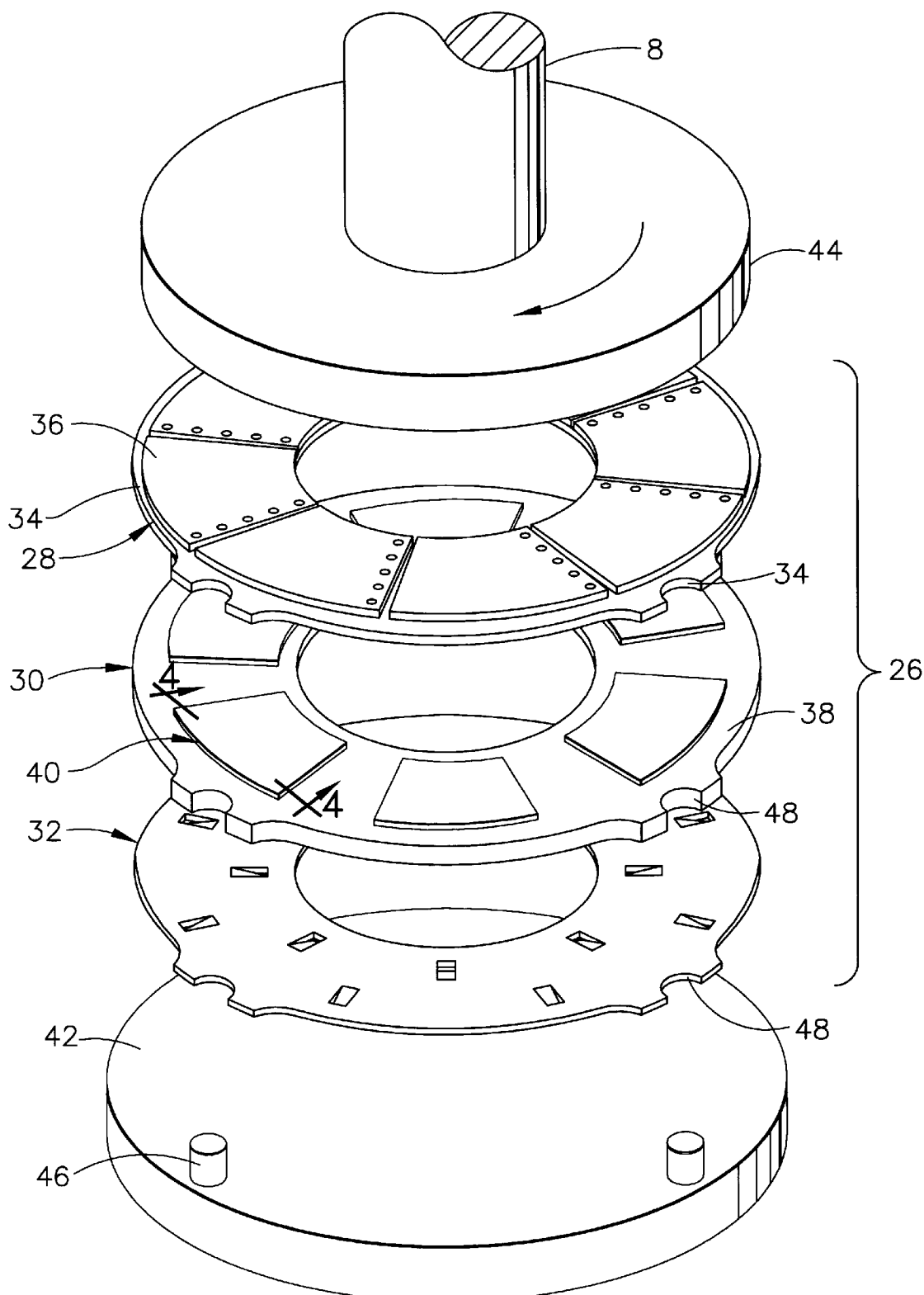
FIG. 3 is an exploded view of a foil thrust bearing according to the present invention.

FIGS. 3 and 4 show a thrust bearing 26 that supports a shaft 8 and allows the shaft 8 to rotate in the clockwise and counterclockwise directions. The thrust bearing 26 includes a foil bearing assembly 28, a spring assembly 30 and a follower spring 32. The foil bearing assembly 28 includes a backing plate 34 and a plurality of thin, compliant foils 36. Each foil 36 has at least one side secured to the backing plate 34 by means such as spot-welding.

The spring assembly 30 includes a stiffener disc 38 and a plurality of spring segments 40 anchored to the stiffener disc 38. Six spring segments 40 are shown merely for exemplary purposes; the thrust bearing 26 could include one or more spring segments 40. Each spring segment 40 supports an overlying foil 36 to improve bearing load carrying capability. The spring segments 40 can be anchored to the stiffener disc 38 by means such as spot welding.

Stiffness of the spring segments 40 can be controlled by corrugating portions of the spring segments 40. Stiffness of each spring segment 40 can be constant in the radial direction, it can increase radially outward, or it can increase radially inward. Stiffness of the spring segments 40 is varied in the directions of rotation as described below in connection with FIGS. 5, 6 and 7.

The thrust bearing 26 is positioned between a housing such as a thrust plate 42 and a runner 44, which is secured to the shaft 8. The follower spring 32 preloads the foil bearing assembly 28 and the spring assembly 30 against the runner 44. Anchoring pins 46 on the thrust plate 42 engage projections 48 on the backing plate 34, the stiffener disc 40 and the spring follower 32 to prevent relative rotation between the bearing assembly 28, the spring assembly 30, the spring follower 32 and the thrust plate 42. The thrust bearing 26 uses a process fluid such as air, methane, water, or gaseous or liquid hydrogen, nitrogen or oxygen. When the runner 44 is rotated relative to the thrust plate 42, a fluid film is generated between the bearing assembly 28 and the runner 44. At high rotational speeds, pressure build-up within the fluid film supports the runner 44, while maintaining a separation between the runner 44 and the bearing assembly 28.

Figure 5:
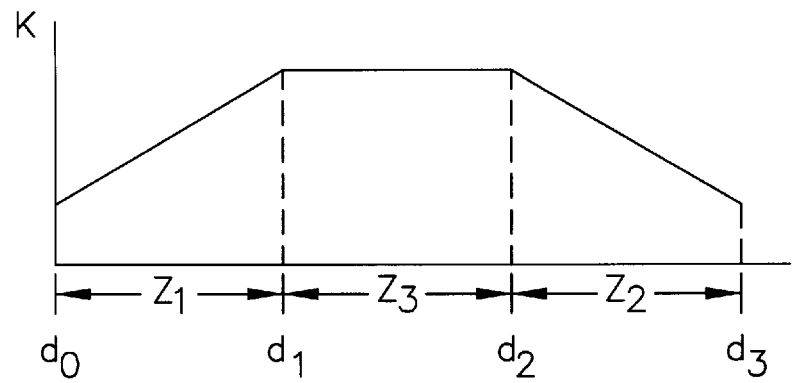
FIG. 5 is a plot of stiffness for spring segments of the foil bearings.
Figure 6:
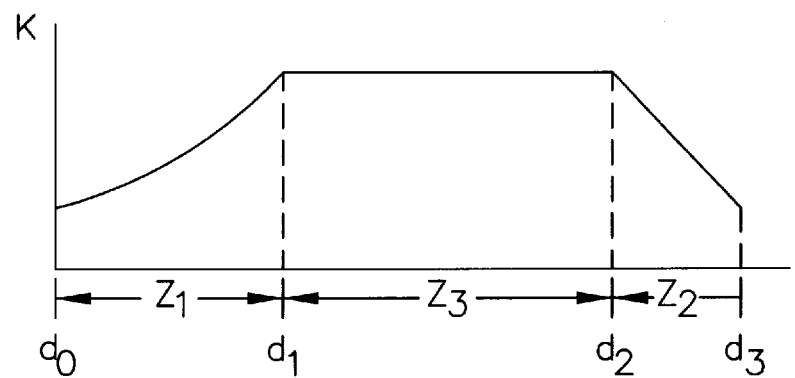
FIG. 6 is another plot of stiffness for spring segments of the foil bearings.
Figure 7:
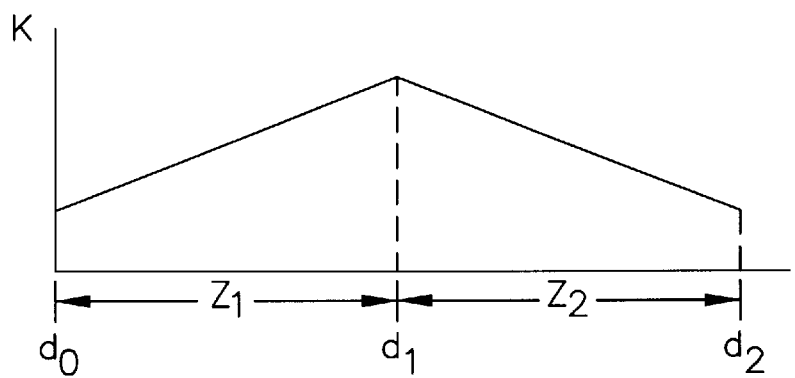
FIG. 7 is yet another plot of stiffness for spring segments of the foil bearings.

Reference is now made to FIGS. 5, 6 and 7, which show three different plots of spring segment stiffness in the directions of rotation. Spring segments 24 or 40 for either the journal bearing 10 or the thrust bearing 26 can be designed according to any of these three plots. Common to all three plots is that the spring segments 24 and 40 have a first stiffness profile in a first zone $Z_1$ and a second stiffness profile in a second zone $Z_2$. The first stiffness profile allows rotation in the first direction, and the second stiffness profile allows rotation in the second direction.

FIG. 5 shows stiffness K of a spring segment increasing linearly across the first zone $Z_1$, remaining relatively constant across a third zone $Z_3$, and decreasing linearly across the second zone $Z_2$. The first, third and second zones $Z_1$, $Z_3$ $Z_2$ might cover approximately equal distances ($d_0$ to $d_1$)=($d_1$ to $d_2$)=($d_2$ to $d_3$). Such symmetric stiffness might be designed for a machine that is run at the same speeds in both directions.

FIG. 6 shows stiffness K of a spring segment increasing non-linearly across the first zone $Z_1$, remaining relatively constant across the third zone $Z_3$, and decreasing linearly across the second zone $Z_2$. The first, third and second zones $Z_1$, $Z_3$ $Z_2$ do not cover equal distances ($d_0$ to $d_1$)≠($d_1$ to $d_2$)≠($d_2$ to $d_3$), with the second zone $Z_2$ having a higher stiffness than the first zone $Z_1$. Such non-symmetric stiffness might be designed for a machine that is run at high speeds in one direction ($d_3$ to $d_0$) and low speeds in the opposite direction ($d_0$ to $d_3$).

FIG. 7 shows stiffness K of a spring segment increasing linearly across the first zone $Z_1$, and decreasing linearly across the second zone $Z_2$.

Thus disclosed are foil bearings 10 and 26 that allow a shaft to rotate in the clockwise and counterclockwise directions. Thus, a high-speed motor using foil journal bearings 10 and/or foil thrust bearings 26 could turn a fan blade in a clockwise direction for blowing air and a counterclockwise direction for creating suction.

Figure 8:
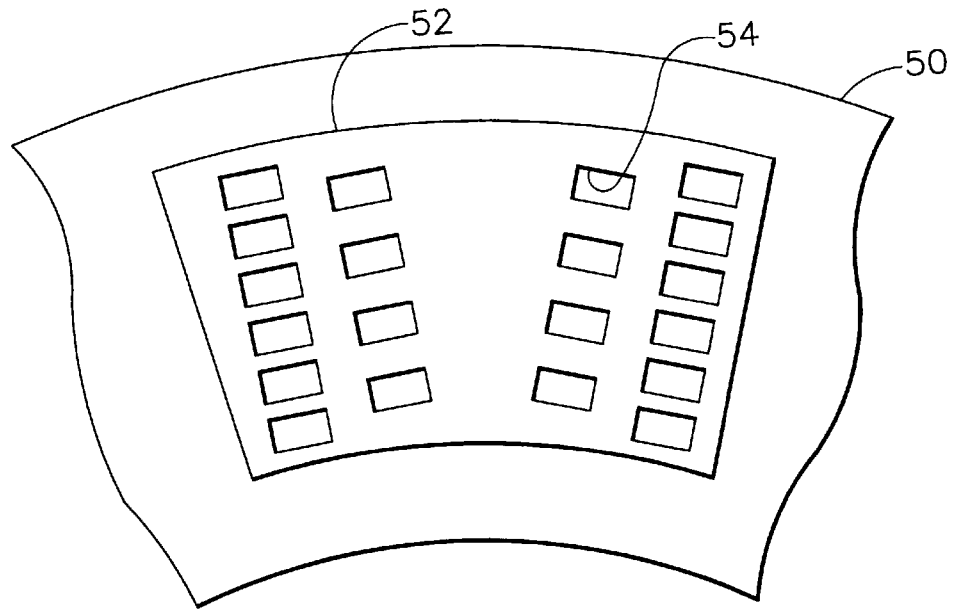
FIG. 8 is a top plan view of an alternative embodiment of a spring segment for the foil thrust bearing.

It is understood that additional changes and modifications could be made without departing from the spirit and scope of the invention. For example, FIG. 8 shows a stiffener disk 50 and a spring segment 52 having a stiffness that is controlled by cutting windows 54 into the spring segment 52. Stiffness of such a spring segment 52 is determined by design parameters such as size and location of the windows 54.

Figure 9:
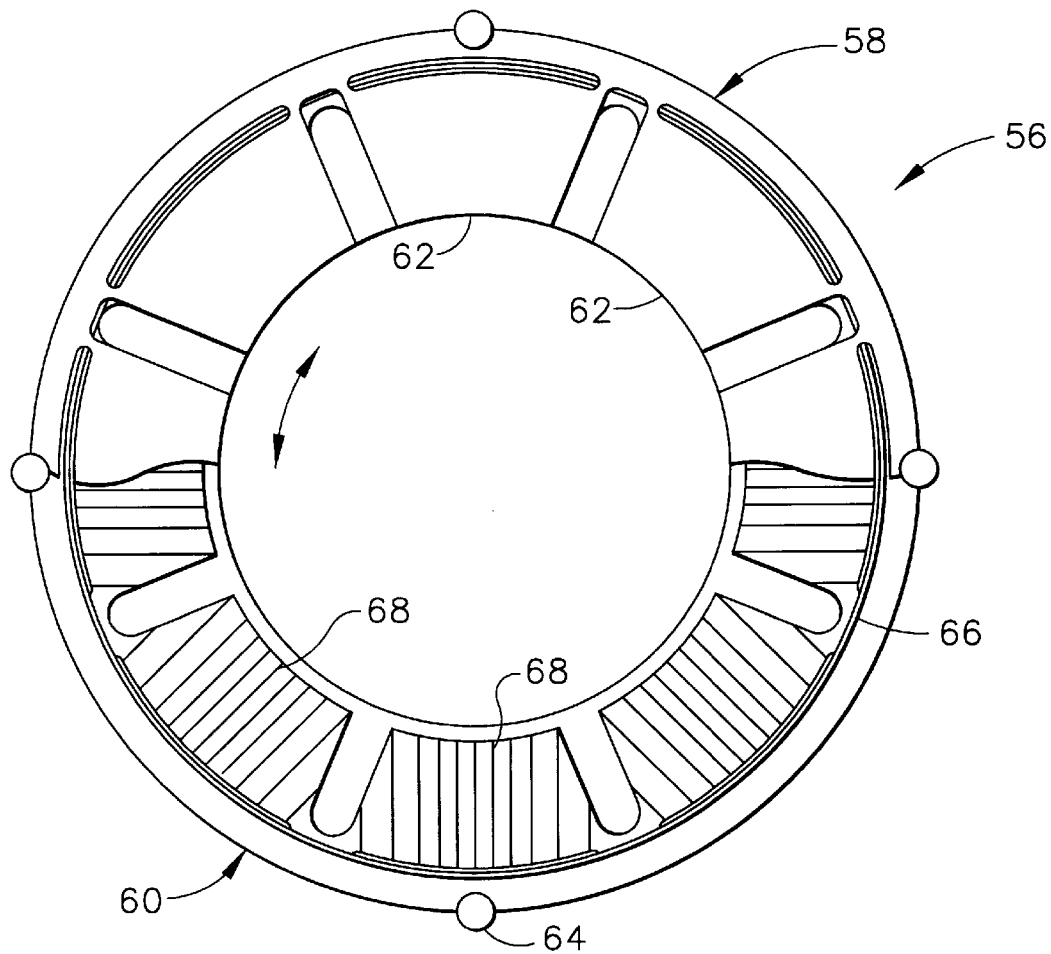
FIG. 9 is a top plan view of an alternative embodiment of the foil thrust bearing, portions of foils being removed for clarity.

FIG. 9 shows an alternative design for the foil bearing assembly 58 and the spring assembly 60 of a thrust bearing 56. The foil bearing 58 assembly includes a single sheet defining a plurality of foils 62. No backing plate is provided. Thus, the sides of the foils 62 are not welded to an underlying structure. Instead the foils 62 are held to the thrust plate (not shown) by pins 64 and a ring 66 to prevent movement in the directions of rotation. The spring assembly 60 includes a plurality of spring segments 68 underlying the foils 62.

Other changes and modifications could be made without departing from the spirit and scope of the invention. The selection of a material for the foils and spring segments (e.g., nickel alloy or stainless steel), the use of a stiffener plate (a stiffener plate might not be needed if the spring segments have sufficient mechanical integrity), the dimensions of the spring segments, the metal foils and the other components of the bearings, as well as the selection of a process fluid, will also be driven by the requirements of the machine for which the foil bearings are designed.

I claim:

1. A foil bearing that is rotatable in first and second directions, the first direction being opposite the second direction, the foil bearing comprising:

a housing;

a foil bearing assembly including a compliant foil secured to the housing; and a spring segment underlying the foil, the spring segment including a first spring portion having a variable stiffness that increases in the first direction, the spring segment further including a second spring portion having a variable stiffness that increases in the second direction.

2. The foil bearing of claim 1, wherein the spring segment also includes a third spring portion between the first and second spring portions, stiffness of the spring segment remaining relatively constant across the third portion.

3. The foil bearing of claim 2, wherein the first, second and third spring portions cover approximately equal distances.

4. The foil bearing of claim 2, wherein the stiffness across the first, third and second portions of the spring segment is symmetrical.

5. The foil bearing of claim 1, wherein the housing includes a cylinder having an axial length, wherein a tab is formed on the foil, wherein the tab is inserted into a slot extending along the axial length of the cylinder, and wherein the spring segment is located between the foil and the housing, whereby the foil bearing is a journal bearing.

6. The foil bearing of claim 1, wherein the housing includes a cylinder having an axial length, wherein first and second tabs are formed at first and second sides of the foil, wherein the first and second tabs are inserted into slots extending along the axial length of the cylinder, and wherein the spring segment is located between the foil and the housing, whereby the foil bearing is a journal bearing.

7. A foil journal bearing comprising:

a housing having a cylindrical inner surface and a plurality of slots extending along an axial length of the inner surface;

a plurality of compliant foils, each foil having at least one tab, each tab being located in one of the slots; and a plurality of spring segments located between the foils and the housing, each spring segment having a first stiffness profile in including a first spring portion having a variable stiffness that increases in the first direction, the spring segment further including a second spring portion having a variable stiffness that increases in the second direction.

8. The journal bearing of claim 7, wherein each foil has first and second tabs, the first tab of each foil being located in one of the slots, the second tab of each foil being located in one of the slots.

9. The journal bearing of claim 7, wherein each spring segment also includes a third portion between the first and second portions, stiffness of each third spring segment remaining relatively constant across the third portion.

10. The journal bearing of claim 9, wherein the first, second and third portions cover approximately equal distances.

11. The journal bearing of claim 9, wherein the stiffness across the first, third and second portions of each spring segment is symmetrical.

* * * * *